United States Patent
Cho et al.

(10) Patent No.: US 12,407,892 B2
(45) Date of Patent: Sep. 2, 2025

(54) METHOD OF SYNCHRONIZING PLAYBACK OF DIGITAL CONTENT BETWEEN PLURALITY OF CONNECTED DEVICES AND DEVICE USING THE SAME

(71) Applicant: AD CONNECTED, INC., Seoul (KR)

(72) Inventors: Inje Cho, Seoul (KR); Daehee Lee, Seoul (KR)

(73) Assignee: AD CONNECTED, INC., Seoul (KR)

( * ) Notice: Subject to any disclaimer, the term of this patent is extended or adjusted under 35 U.S.C. 154(b) by 153 days.

(21) Appl. No.: 18/548,020

(22) PCT Filed: Feb. 26, 2021

(86) PCT No.: PCT/KR2021/002503
§ 371 (c)(1),
(2) Date: Aug. 25, 2023

(87) PCT Pub. No.: WO2022/181859
PCT Pub. Date: Sep. 1, 2022

(65) Prior Publication Data
US 2024/0298059 A1    Sep. 5, 2024

(51) Int. Cl.
*H04N 21/8547* (2011.01)
*H04N 21/43* (2011.01)

(52) U.S. Cl.
CPC ... *H04N 21/43076* (2020.08); *H04N 21/8547* (2013.01)

(58) Field of Classification Search
CPC .............. H04N 21/43076; H04N 21/8547
See application file for complete search history.

(56) References Cited

U.S. PATENT DOCUMENTS

| | | | |
|---|---|---|---|
| 2013/0268980 A1* | 10/2013 | Russell | H04N 21/6332 725/75 |
| 2015/0081068 A1* | 3/2015 | Cheng | H04N 21/436 700/94 |
| 2017/0181113 A1* | 6/2017 | Keyser-Allen | H04N 21/43076 |

* cited by examiner

*Primary Examiner* — Thai Q Tran
*Assistant Examiner* — Jose M Mesa
(74) *Attorney, Agent, or Firm* — Studebaker Brackett PLLC

(57) ABSTRACT

The present invention relates to a method of synchronizing playback of a digital content between connected devices, the method including: receiving a playback delay time list or a playback sync timestamp from a master device during a playback duty cycle; calculating a playback delay time correction amount by referring to the playback delay time list in order to synchronize playback between a plurality of connected devices including the master device; correcting a playback sync timestamp used in the playback synchronization according to the playback delay time correction amount; and playing a digital content according to the corrected playback sync timestamp, and the slave device applies a different playback delay time in consideration of the slave device's own state, so that the playback of the digital content may be synchronized between the devices connected through the network.

15 Claims, 5 Drawing Sheets

METHOD OF SYNCHRONIZING PLAYBACK OF DIGITAL CONTENT BETWEEN PLURALITY OF CONNECTED DEVICES AND DEVICE USING THE SAME

CROSS-REFERENCE TO RELATED APPLICATIONS

This application is a U.S. National Stage of International Application No. PCT/KR2021/002503 filed Feb. 26, 2021, the entire content of which is incorporated herein by reference.

TECHNICAL FIELD

The present invention relates to a method of synchronizing playback of a digital content between connected devices, and more particularly, to a method of synchronizing playback of a digital content between a plurality of connected devices, in which a slave device applies a different playback delay time in consideration of a state of the slave device and playback is synchronized between devices that are connected through a network, and a device using the same.

BACKGROUND ART

For the playback synchronization of audio contents and video contents, a master clock of a master device and a playback delay time need to be adjusted. In the related art, local clocks of all of the slave devices are synchronized based on the master clock. Further, the playback of digital contents is synchronized in consideration of a playback sync time sent by the master device in consideration of different machine specifications and available resource states for each slave device.

In this case, in a slave device having a large clock drift with the master clock or a slave device having low machine specifications and small available resources, playback synchronization available time is relatively short within a limited playback duty cycle. In order to solve the problem, in consideration of the state of the slave device, it is necessary to perform playback synchronization by adjusting the playback delay time together with the master device based on a different reference for each slave device.

Prior Art 1 (KR 10-2017-0016413 A, published on Feb. 13, 2017) relates to a playback synchronization method, in which a first device plays a content according to a playback schedule and transmits the playback schedule to a second device so that the second device is also capable of playing a content according to the playback schedule. According to Prior Art 1, the contents that are being played back on one device may identically appear on another device.

Prior Art 2 (KR 10-2017-0044922 A, Apr. 26, 2017) relates to a method of synchronizing and playing contents between multiscreen devices, and discloses the content that a first multiscreen device requests a content for synchronization to a second multiscreen device, and when the second multiscreen device provides the first multiscreen device with the content and synchronization information, the first multiscreen device performs content synchronization and playback by using the synchronization information.

However, reviewing Prior Arts 1 and 2, the plurality of devices only synchronize the contents by transmitting, by any one device, synchronization information to another device like the related art, but it is not possible to reduce the delay time between the plurality of devices while reflecting characteristics, such as different machine specifications and available resources, for each device.

DISCLOSURE

Technical Problem

Accordingly, the first problem to be solved by the present invention is to provide a method of synchronizing playback of a digital content between connected devices, in which a slave device applies different playback delay time in consideration of a slave device's own state, so that the playback is synchronized between devices connected through a network.

The second problem to be solved by the present invention is to provide a connected device synchronizing playback of a digital content, which is capable of reducing a delay time difference between a plurality of devices through a training time period in consideration of a playback delay time difference due to different machine specifications and available resources for each device.

Further, the present invention is to provide a computer-readable recording medium in which a program for executing the method in a computer is recorded.

Technical Solution

In order to solve the first problem, the present invention provides a method of synchronizing playback of a digital content between connected devices, the method including: receiving a playback delay time list or a playback sync timestamp from a master device during a playback duty cycle; calculating a playback delay time correction amount by referring to the playback delay time list in order to synchronize playback between a plurality of connected devices including the master device; correcting a playback sync timestamp used in the playback synchronization according to the playback delay time correction amount; and playing a digital content according to the corrected playback sync timestamp.

According to an exemplary embodiment of the present invention, the method may further include transmitting, by the connected device, a playback delay time corrected during the playback duty cycle to the master device.

According to another exemplary embodiment of the present invention, the method may further include transmitting a user feedback signal input during the playback duty cycle to the master device.

Further, it is desirable that the playback duty cycle is determined based on a frame rate of the digital content. Further, it is desirable that a time difference between the playback delay times included in the playback delay time list is within a range of the playback duty cycle.

In the calculating of the playback delay time correction amount, it is desirable that the playback delay time correction amount is determined by calculating the difference based on a playback delay time of a connected device which minimizes a difference between the playback delay time lists of the plurality of connected devices including the master device.

The plurality of connected devices may change and store position information of a digital content generated by playback asynchronization, that is, position information of a timestamp, and play the digital contents with the timestamp information of the position adjusted through the playback delay time correction amount, thereby optimizing playback synchronization of the plurality of connected devices. Further, after the application of the playback delay time correction amount, re-correction is possible by sharing the playback delay time for the timestamp of the currently playing digital content for each predetermined duty cycle from the plurality of connected devices.

According to another exemplary embodiment of the present invention, a method of synchronizing playback of a digital content between connected devices may include: receiving a playback delay time from a plurality of connected devices during a playback duty cycle; generating a playback delay time list by using the playback delay time received from each of the plurality of connected devices and a playback delay time of a master device, and calculating a playback sync timestamp by using the playback delay time list; and transmitting the generated playback delay time list or a playback sync timestamp used in playback synchronization to the connected devices.

It is desirable that the playback sync timestamp for the playback synchronization is determined based on the playback delay time list or a time difference between the playback delay times included in the playback delay time list. The playback duty cycle may be determined based on a frame rate or channel information of the digital content.

It is desirable that the playback delay time correction amount is determined by calculating a difference based on a playback delay time of a connected device which minimizes the difference between the playback delay time lists of the plurality of connected devices including the master device receiving the playback delay time.

According to another exemplary embodiment of the present invention, a method of synchronizing playback of a digital content between connected devices may include: receiving, by a master device, a playback delay time from a plurality of connected devices during a playback duty cycle; generating a playback delay time list by using the playback delay time received from each of the plurality of connected devices and a playback delay time of a master device, and calculating a playback sync timestamp by using the playback delay time list; transmitting the generated playback delay time list or a playback sync timestamp used in playback synchronization to the connected devices; receiving, by the plurality of connected devices, the playback delay time list or the playback sync timestamp used for the playback synchronization from the master device during the playback duty cycle; calculating a playback delay time correction amount by referring to the playback delay time list in order for the plurality of connected devices including the master device to synchronize playback; correcting, by the master device and the plurality of connected devices, the playback sync timestamp used for the playback synchronization according to the playback delay time correction amount; and playing a digital content according to the corrected playback sync timestamp.

In order to solve the second problem, the present invention provides a connected device for synchronizing playback of a digital content, the connected device including: a reception unit configured to receive a playback delay time list or a playback sync timestamp from a master device during a playback duty cycle; a playback delay time correction amount calculation unit configured to calculate a playback delay time correction amount by referring to the playback delay time list in order to synchronize playback between a plurality of connected devices including the master device; a playback sync timestamp correction unit configured to correct a playback sync timestamp used for the playback synchronization according to the playback delay time correction amount; and a playback unit configured to play a digital content according to the corrected playback sync timestamp.

As another exemplary embodiment for solving the second problem, the present invention provides a master device for synchronizing playback of a digital content between connected devices, the maser device including: a reception unit configured to receive a playback delay time from a plurality of connected devices during a playback duty cycle; a playback delay time list generation unit configured to generate a playback delay time list by using a playback delay time received from each of the plurality of connected devices, and a playback delay time of the master device; and a transmission unit configured to transmit the generated playback delay time list or a playback sync timestamp used in playback synchronization to the connected devices.

As still another exemplary embodiment for solving the second problem, the present invention provides a system for synchronizing playback of a digital content between connected devices, the system comprising: at least one connected device including: a reception unit configured to receive a playback delay time list or a playback sync timestamp from a master device during a playback duty cycle; a playback delay time correction amount calculation unit configured to calculate a playback delay time correction amount by referring to the playback delay time list in order to synchronize playback between a plurality of connected devices including the master device; and a playback sync timestamp correction unit configured to correct a playback sync timestamp used for the playback synchronization according to the playback delay time correction amount; and a master device including a playback unit which plays a digital contents according to the corrected playback sync timestamp; reception unit configured to receive a playback delay time from a plurality of connected devices during a playback duty cycle; a playback delay time list generation unit configured to generate a playback delay time list by using a playback delay time received from each of the plurality of connected devices, and a playback delay time of the master device; and a transmission unit configured to transmit the generated playback delay time list or a playback sync timestamp used in playback synchronization to the connected devices.

In order to solve the other technical problem, the present invention provides a computer-readable recording medium in which a program for executing the method of synchronizing playback of a digital content between the connected devices in a computer is recorded.

Advantageous Effects

According to the present invention, the slave device applies the different playback delay time in consideration of the slave device's own state, so that the playback is synchronized between the devices connected through the network.

Further, according to the present invention, it is possible to reduce a delay time difference between the plurality of devices through a training time period in consideration of a playback delay time difference due to a different machine specification and available resource for each device.

BEST MODE

Figure 1:
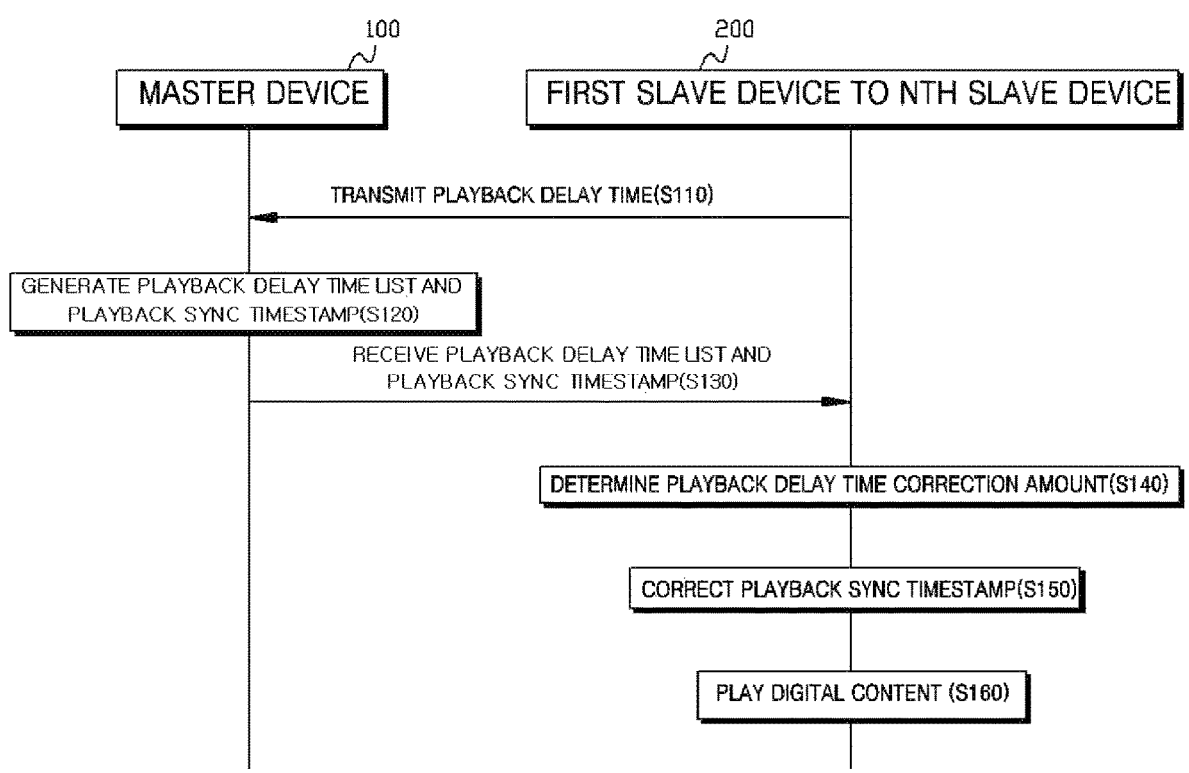
FIG. 1 illustrates a process of synchronizing playback of a digital content between connected devices according to an exemplary embodiment of the present invention.

The present invention relates to a method of synchronizing playback of a digital content between connected devices, the method including: receiving a playback delay time list or a playback sync timestamp from a master device during a playback duty cycle; calculating a playback delay time correction amount by referring to the playback delay time list in order to synchronize playback between a plurality of connected devices including the master device; correcting a playback sync timestamp used in the playback synchronization according to the playback delay time correction amount; and playing a digital content according to the corrected playback sync timestamp, and the slave device applies a different playback delay time in consideration of the slave device's own state, so that the playback of the digital content is synchronized between the devices connected through the network.

Mode for Carrying Out the Invention

Hereinafter, exemplary embodiments will be described in detail with reference to the accompanying drawings so that those skilled in the art can easily implement the present invention. However, the exemplary embodiments are for describing the present invention in more detail, and it will be apparent to those skilled in the art that the scope of the present invention is not limited thereto.

The configuration of the invention for clarifying the solution to the problem to be solved by the present invention will be described in detail with reference to the accompanying drawings based on the exemplary embodiment of the present invention, and it should be noted in advance that in assigning reference numerals to the components of the drawings, the same reference numeral is assigned to the same component even though the component is included in a different drawing, and components of other drawings may be cited if necessary when the drawing is described. In the detailed description of an operation principle of the exemplary embodiment of the present invention, when a detailed description of a related publicly known function or constituent element and other accompanying matters are determined to unnecessarily make the subject matter of the present invention unclear, the detailed description thereof will be omitted.

FIG. 1 is a diagram illustrating a process of synchronizing playback of a digital content between connected devices according to an exemplary embodiment of the present invention.

Referring to FIG. 1, information for synchronization is transceived in the state where a master device 100 and a plurality of slave devices 200 (a first slave device to an $n^{th}$ slave device) are connected through a network.

In operation 110, the plurality of slave devices 200 transmits playback delay time information to the master device 100 connected through the network. The slave device and the slave device, and the slave device and the master device are wirelessly connected through the network, so that the plurality of slave devices 200 may be a connected device. The connected device may conceptually include a master device. It is desirable that a playback duty cycle of each slave device is determined in consideration of a frame rate of a played content.

In operation 120, the master device 100 generates playback delay time lists and playback sync timestamps of the entire slave devices 200 by using the playback delay time information received in operation 110.

In operation 130, each slave device 200 receives the generated playback delay time list information and playback sync timestamps from the master device 100.

In operation 140, each slave device 200 determines a playback delay time correction amount within the playback duty cycle by using the playback delay time list and the playback duty cycle received from the master device 100. A delta playback delay time list representing a difference between a master playback delay time included in the list and the playtime delay time of each slave may be generated from the playback delay time list.

In operation 150, each slave device 200 corrects the playback sync timestamp received in operation 130 by using the playback delay time correction amount. It is desirable that the difference of the playback delay time of each slave device is within the playback duty cycle even after the correction of the playback sync timestamp.

In operation 160, each slave device 200 plays a digital content according to the corrected playback sync timestamp.

When a feedback signal of a user is received and the feedback signal is transmitted during the playback duty cycle after the playback of the digital content is synchronized between the master device and the slave device, the feedback of the user may be effectively processed without a time delay incurable in the plurality of devices.

Figure 2:
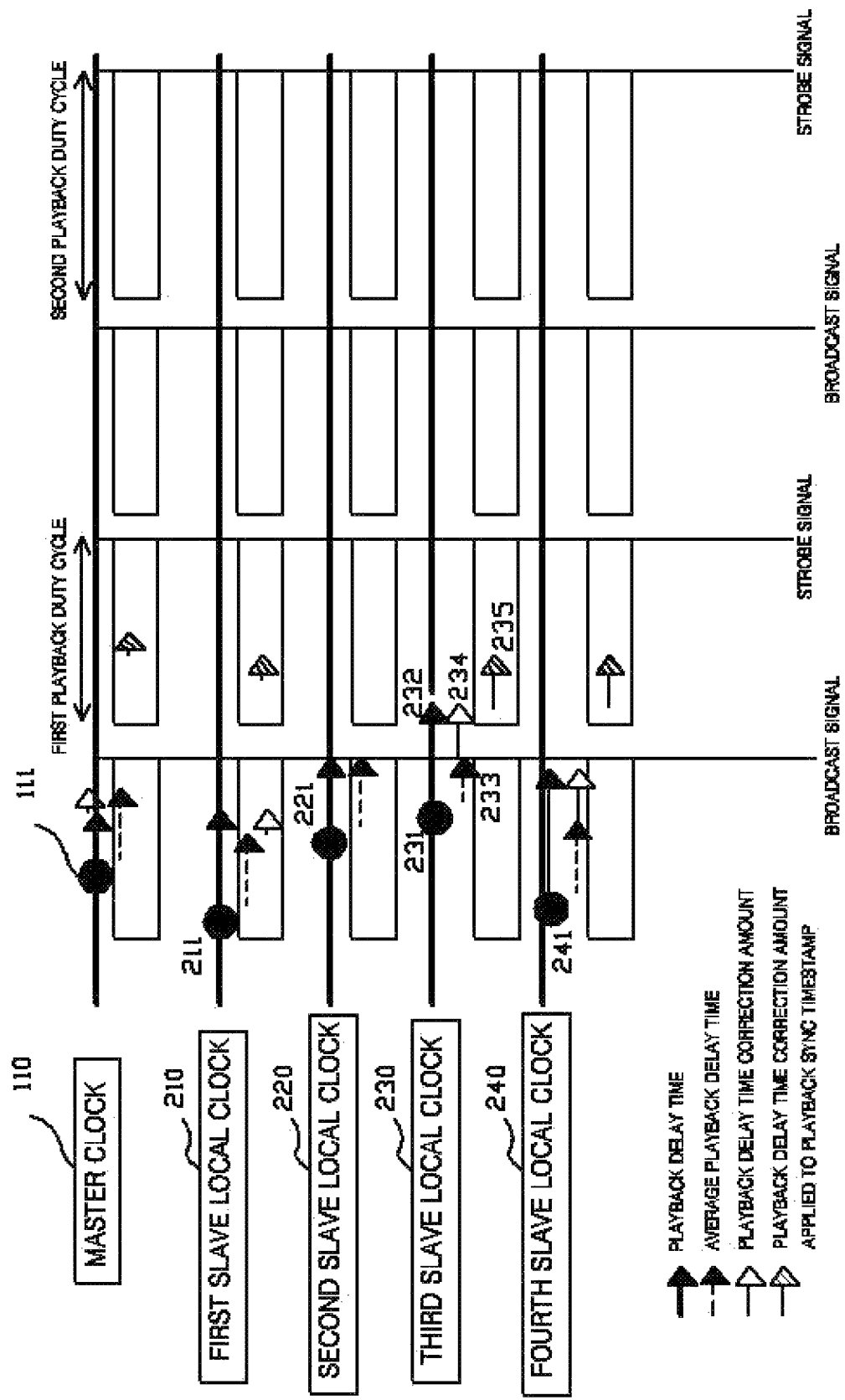
FIG. 2 illustrates clock information between a master device and slave devices connected through a network.

FIG. 2 illustrates clock information between the master device and the slave devices connected through a network.

Referring to FIG. 2, the master device plays a digital content according to a master clock 110, and the slave devices play the digital content according to local clocks 210, 220, 230, and 240 of the slaves, respectively.

A time point at which a specific digital content is played back in the master clock 110 of the master device is indicated by 111, and times at which the specific digital content is played back based on the slave local clocks 210 to 240 of the slave devices are indicated by 211, 221, 231, and 241.

Referring to the clock information illustrated in FIG. 2, it is represented that the first slave device and the fourth slave device play back the specific digital content faster than the master device, and the second slave device and the third slave device play back the specific digital content later than the master device.

It is desirable that the playback delay time is calculated in consideration of timestamp information of the digital content played back during the playback duty cycle in the master device and the slave devices. That is, the master device and the slave devices calculate the playback delay time by calculating a difference in the timestamp of the digital content played back during the playback duty cycle in consideration of each of the clock information 210 to 240.

That is, the playback delay time may be defined as described below in consideration of two timestamp A and B of the digital content existing in one playback duty cycle or the different duty cycles. In the case where the timestamps exist in the different duty cycles, a duty cycle, in which the digital content playback needs to be synchronized, may be calculated by using a difference value between the timestamps A and B.

Playback delay time=(($n^{th}$ slave local clock (timestamp B of digital content)–$n^{th}$ slave local clock (timestamp A of digital content))–((timestamp B of digital content–timestamp A of digital content)).

In this case, the timestamps A and B exist in one playback duty cycle, and B has a larger value than that of A.

The timestamp is the time included in the digital content and means a playback time of a specific frame in the case of a video digital content.

The $n^{th}$ slave local clock (the timestamp B of the digital content) means the local clock at which the timestamp B of the digital content is played back, so that $n^{th}$ slave local clock (timestamp B of digital content)–$n^{th}$ slave local clock (timestamp A of digital content) represents a difference between the local clocks at which the timestamp B and the timestamp A are played back in the $n^{th}$ slave device.

Further, (timestamp B of digital content–timestamp A of digital content) represents an absolute time difference between the timestamp B and the timestamp A.

Accordingly, the playback delay time may be calculated by reflecting the difference between the timestamps to the difference between the local clocks of the two timestamps.

The master device generates at least one of the playback delay time list, a time difference between the playback delay times, and the delta playback delay time list (refers to a difference between the master playback delay time and each slave playback delay time, or a playback delay time list calculated based on a difference between a playback delay time of a virtual master device and the playback delay time of each slave device by selecting the virtual master device which minimizes the sum of the difference in the playback delay time between the respective devices, and in this case, the virtual master device for correcting the playback delay time may be changed for each duty cycle) received from the salve device for every uniform playback duty cycle and then broadcasts the generated one to all of the slave devices. In this case, it is desirable that the broadcasting is repetitively performed for each playback duty cycle.

The master device calculates a playback sync timestamp so that the salve devices connected to the network do not have problems in the playback synchronization during the playback duty cycle by using the playback delay time list information and broadcasts the playback sync timestamp.

The broadcasted playback delay timestamp serves as a reference for application of the playback delay time to the digital content during a next playback duty cycle.

The reason why the master device broadcasts the playback sync timestamp is that it is possible to check the number of times of the playback duty cycle, at which the playback is efficiently synchronized, by using the playback delay time information of each slave device. Accordingly, the master device calculates the playback delay time differences of all of the devices by using the playback delay times of all of the slave devices, and when the calculated playback delay time difference is included in one playback duty cycle, an additional playback delay time correction is not required, so that the master device does not need to broadcast the playback sync timestamp.

However, even though the master device does not need to broadcast the playback sync timestamp, the slave devices may send the playback delay times to the master device through a strobe signal to help the master device to monitor the playback delay time.

In the meantime, the slave device calculates a playback delay time correction amount of the slave device by using the received playback delay time list or the delta playback delay time list.

It is desirable that the playback delay time correction amount of the slave device is calculated in each slave device, not the playback delay time correction amount transmitted from the master device.

The playback delay time and the playback delay time correction amount will be described in more detail through the third slave local clock 230 of FIG. 2.

Referring to the third slave local clock 230 of the third slave device, the playback delay time 232 is out of the corresponding duty cycle.

In this case, the third slave device may calculate an average playback delay time by using an average value of the playback delay time difference lists or the delta playback delay time lists of the master device and the slave device connected to the network without calculating the playback delay time correction amount in consideration of the playback delay time of the master device. A difference 234 between the calculated average playback delay time 233 and the playback delay time 232 of each device may be applied as a playback delay time correction amount 235 of the third slave device.

Each slave device needs to correct the timestamp information to be played back as much as the playback delay time correction amount. When the playback delay correction amount is large, the playback delay time is large, so that a timestamp of the digital content that is earlier than that of another slave device is being played back. Accordingly, in this case, it is necessary to play the digital content to be played back in advance compared to another device. Accordingly, the slave device changes a current playback position of the digital content, that is, the timestamp, and stores the changed timestamp, and then plays the digital content.

Then, for each uniform duty cycle, the slave device calculates a playback local clock by using the previously calculated timestamp and the current timestamp, and calculates a playback delay time, and transmits the calculated playback local clock and playback delay time to the master device. The master device may monitor a size of the received playback delay time and determine whether a broadcasting signal for playback synchronization is transmitted.

As another example, the average playback delay time may be applied as the playback delay time correction amount 235. In this case, the master device applies the correction amount that is identical to the playback delay time correction amount applied to the slave device, so that a playback time difference between the master device and the slave device connected to the network is reduced.

Further, all of the differences between the adjusted values included in the delta playback delay time lists of the master device and the slave device connected to the network need to be smaller than the playback duty cycle and adjusted within the playback duty cycle. Accordingly, during the playback duty cycle, the time difference of the playback time is relatively adjusted asynchronously between the master device and the slave devices, so that in the next playback duty cycle, the relative time difference decreases, and playback synchronization may be performed stably between all of the devices.

By using the foregoing condition, the master device may set a playback sync timestamp.

The third slave device has a longer playback delay time 232 than those of other devices, so that the possibility of playing the digital content by synchronizing a content frame to the playback sync timestamp set by the master device is lowest. Accordingly, in order to increase the possibility of synchronizing content playback in multiple devices, as a method of minimizing the playback delay time correction amount, a playback delay time correction amount is calculated for each slave device by using an average value of the time differences of the entire playback delay time list and the calculated value is reflected to the playback delay time within the playback duty cycle. It can be seen that when the playback delay time correction amount 235 of the third salve local clock 230 is out of the playback duty cycle, the playback delay time correction amount 235 is adjusted to be included in the playback duty cycle range.

The master device may select the playback sync timestamp within the predefined playback duty cycle by reflecting the playback delay time correction amount condition. In this case, the playback delay time correction amount 235 shorter than the playback delay time 232 of the third slave local clock 230 is applied, and the playback delay time correction amount 235 is adjusted within the playback duty cycle.

Accordingly, in the case of the third slave local clock 230, when the digital contents is played back with the playback sync timestamp of the first playback duty cycle, the playback delay time 235 occurs. Further, even in the case of the master device, the playback delay time correction amount has been applied, so that the average value of the entire delta playback delay time lists is reduced.

The playback duty cycle may be adjusted by using resolution and channel information of the content to be played back. When resolution of the content is high and a lot of channel information is included, each network device has a relatively low probability of playing the content at a specific playback time. Accordingly, as the resolution of the content to be played back is high and the number of channels is large, the master device may set the playback duty cycle to be relatively long. In FIG. 2, it is illustrated that the second playback duty cycle is set to be longer than the first playback duty cycle. The definition of the playback duty cycle may be set in the master device by using a frame rate and the channel information of the content to be played back.

The playback sync timestamp is the playback synchronization time of each slave device set by the master device 100.

When the playback delay time correction amount is determined, the received timestamp value of the digital content needs to be adjusted, and even when the playback delay time is adjusted by the playback delay time correction amount 235 in the third slave device, there is a difference in the playback delay time from another slave device.

However, the playback delay time 235 in the first playback duty cycle is shorter than the playback delay time 232 generated in the previous playback duty cycle. Further, the time difference is also reduced in the playback delay time list. Then, when the time difference satisfies a predetermined threshold value while the process is repeated, training for the playback synchronization may be terminated or reserved.

The correction of the playback delay time correction amount and the playback synchronization timestamp of the master device or between the slave devices connected to the network need to be continuously performed for every playback duty cycle, and for the synchronization, a training period for calculating the playback delay time correction amount between all of the devices is required.

Thereafter, the master device may selectively broadcast the playback delay time list or the delta playback delay time list collected for each playback duty cycle only when retraining is required, and the slave device may apply the playback delay time correction amount and the playback synchronization timestamp correction when the playback delay time list or the delta playback delay time list is received.

The case where the master device determines the selective broadcasting during the training period is the case where at least one time difference among the time differences of the delta playback delay time lists of all of the devices exceeds the playback duty cycle. In this case, the master device may make the playback of the content of the slave device be synchronized again by broadcasting the received playback delay time list and a new playback sync timestamp.

Further, the slave device may always transmit the playback delay time or delta playback delay time information generated in the slave device during the predetermined playback duty cycle to the master device as a strobe signal.

Another case where the master device determines the selective broadcasting is the case where a content frame rate is changed. When a communication state is not good or the content frame rate is artificially adjusted, the playback duty cycle needs to be adjusted, and thus, it is desirable to perform the training for the content playback synchronization between the plurality of devices.

Figure 3:
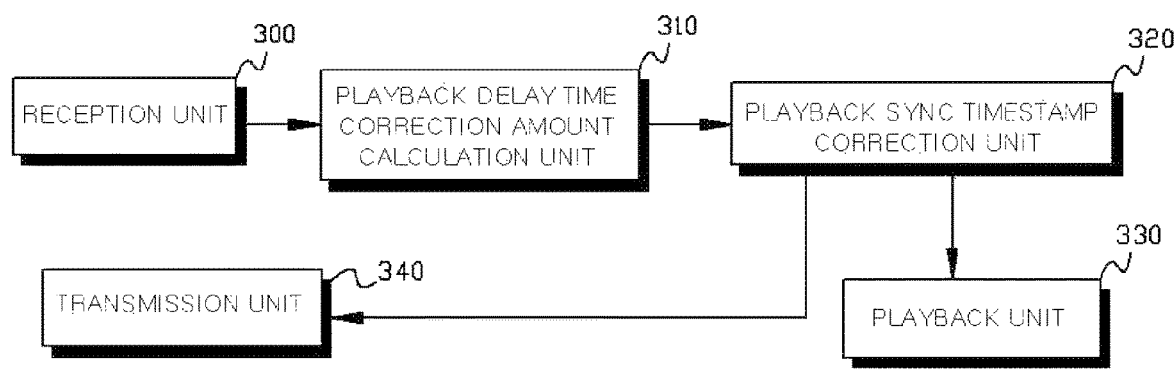
FIG. 3 is a block diagram illustrating a connected device synchronizing playback of a digital content according to the exemplary embodiment of the present invention.

FIG. 3 is a block diagram illustrating a connected device for synchronizing playback of a digital content according to the exemplary embodiment of the present invention.

Referring to FIG. 3, the connected device for synchronizing playback of a digital content according to the exemplary embodiment of the present invention includes a reception unit 300, a playback delay time correction amount calculation unit 310, a playback sync timestamp correction unit 320, a playback unit 330, and a transmission unit 340.

The reception unit 300 receives a playback delay time list or a playback sync timestamp from the master device during the playback duty cycle. The received playback delay time list is generated by the master device by using the playback delay time received from each of the plurality of connected devices. A time difference between the playback delay times or the delta playback delay time list (refers to the difference between the master playback delay time and each slave playback delay time) may be generated from the playback delay time list.

The playback delay time correction amount calculation unit 310 calculates a playback delay time correction amount by referring to the playback delay time list in order to synchronize playback between the plurality of connected devices including the master device. According to the exemplary embodiment of the present invention, the plurality of connected devices does not adjust the playback delay time correction amount by using the playback delay time of the master device, but may generate an average value of playback delay time difference lists or the delta playback delay time lists of the master device and the slave device connected to the network, and apply the difference between the generated average value and the playback delay time of each slave device as the playback delay time correction amount of each slave device. In the exemplary embodiment of the present invention, the average value is used, but other statistical values may be replaced.

As another exemplary embodiment of calculating the playback delay time correction amount, when the playback delay time difference between the connected devices is calculated based on the playback delay time of anyone connected device, a reference connected device that minimizes the sum of the differences may be determined.

In the case where the master device determines the reference connected device, when the master device transmits a playback delay time difference list to each slave device, each slave device may calculate the playback delay time correction amount by using the playback delay time difference list.

In the meantime, when each slave device determines the reference connected device, the master device may transmit the playback delay time list to each slave device, and each slave device may determine the reference connected device by referring to the playback delay time list.

The playback sync timestamp correction unit 320 corrects the playback sync timestamp used for the playback synchronization according to the playback delay time correction amount.

The playback unit 330 plays a digital content according to the corrected playback sync timestamp.

The transmission unit 340 transmits a playback delay time corrected with the playback delay time correction amount to the master device. When the transmission unit 340 transmits the playback delay time to the master device, the transmission unit 340 may reflect flag information on whether the playback delay time correction amount is applied and transmit the playback delay time. In this case, the master device may easily determine whether the playback delay time correction amount of the slave device is applied.

Figure 4:
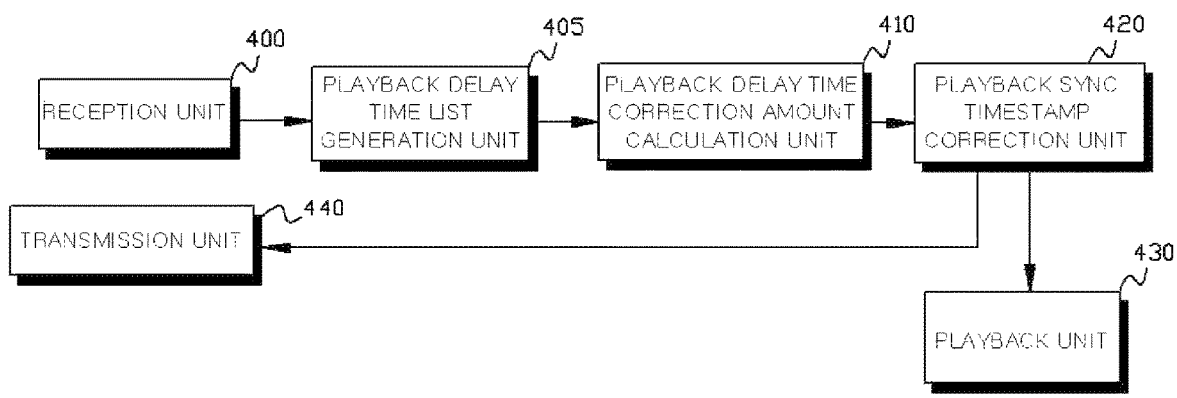
FIG. 4 is a block diagram illustrating a master device synchronizing playback of a digital content according to the exemplary embodiment of the present invention.

FIG. 4 is a block diagram illustrating the master device for synchronizing playback of a digital content according to the exemplary embodiment of the present invention.

Referring to FIG. 4, the master device for synchronizing playback of a digital content according to the exemplary embodiment of the present invention includes a reception unit 400, a playback delay time list generation unit 405, a playback delay time correction amount calculation unit 410, a playback sync timestamp correction unit 420, a playback unit 430, and a transmission unit 440.

The reception unit 400 periodically receives the playback delay time from the plurality of connected devices during the playback duty cycle.

The playback delay time list generation unit 405 generates a playback delay time list by using the playback delay time received from each of the plurality of connected devices.

A time difference between the playback delay times or the delta playback delay time list (refers to the difference between the master playback delay time and each slave playback delay time) may be generated from the playback delay time list.

The playback delay time correction amount calculation unit 410 calculates a playback delay time correction amount by referring to the playback delay time list in order to synchronize playback between the plurality of connected devices. According to the exemplary embodiment of the present invention, the plurality of connected devices does not adjust the playback delay time correction amount by using the playback delay time of the master device, but it is desirable that the plurality of connected devices calculate the playback delay time correction amount by using an average value of the playback delay time difference lists or the delta playback delay time lists of the master device and the slave device connected to the network.

The playback sync timestamp correction unit 420 corrects the playback sync timestamp used for the playback synchronization according to the playback delay time correction amount.

The playback unit 430 plays a digital content according to the corrected playback sync timestamp.

The transmission unit 440 transmits the generated playback delay time list or the playback sync timestamp used for the playback synchronization to the connected devices.

Figure 5:
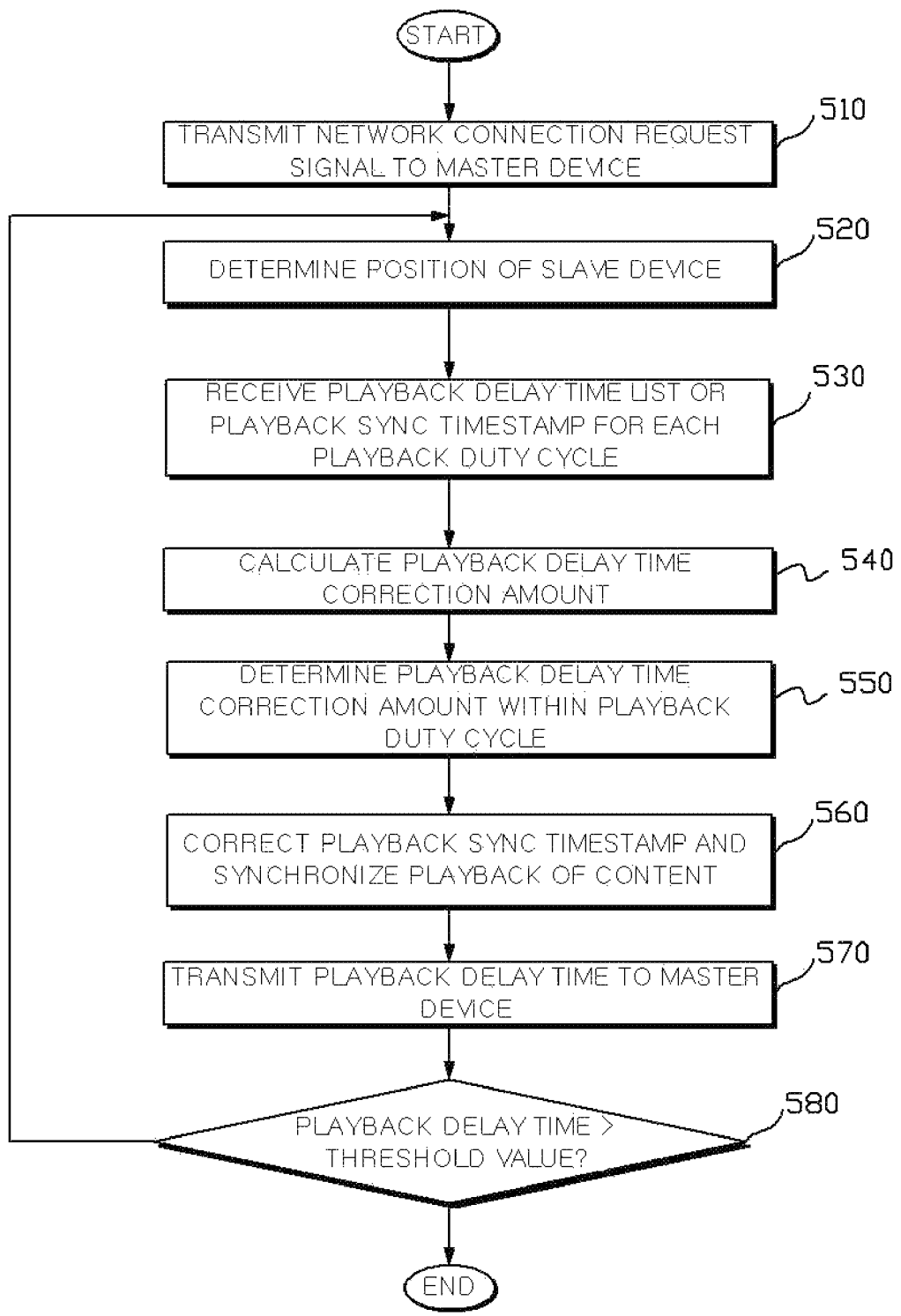
FIG. 5 is a flowchart illustrating a method of synchronizing, by a connected device, playback of a digital content according to an exemplary embodiment of the present invention.

FIG. 5 is a flowchart illustrating a method of synchronizing, by the connected device, playback of a digital content according to an exemplary embodiment of the present invention.

Referring to FIG. 5, a method of synchronizing playback of a digital content by the connected device according to the present exemplary embodiment includes operations time-serially processed by the connected device illustrated in FIG. 3. Accordingly, even if omitted below, the contents described above with respect to the connected device illustrated in FIG. 3 is also applied to the method of synchronizing playback of a digital content by the connected device according to the present exemplary embodiment.

In operation 510, the slave device requests the master device for a network connection request signal.

In operation 520, the slave device determines a position of the slave device. The position information of the slave device may also be determined by each slave device and be determined by the master device. The position information of the slave device may be calibrated based on position information received from a camera mounted to the master device and the slave device.

In operation 530, the slave device receives a playback delay time list, delta playback delay time list information, or playback sync timestamp information collected by the master device during a playback duty cycle. It is desirable that the playback duty cycle is determined by the master device in consideration of a frame rate of the played content. A local clock drift list or a delta local clock drift list may be further included in addition to the playback delay time list or the delta playback delay time list information.

In the meantime, it is preferable that the playback delay time list of the plurality of slave devices or the playback sync timestamp used for the playback synchronization is included in training data, and the slave device may periodically receive the training data used for the display playback synchronization within the playback duty cycle.

In operation 540, the slave device calculates a playback delay time correction amount. In order to synchronize the playback between the slave devices, it is desirable that the playback delay time correction amount is calculated by referring to the playback delay time list included in the training data. In the meantime, the master device calculates the playback delay time correction amount of the playback sync timestamp of the master device.

In operation 550, the playback delay time correction amount is determined within the playback duty cycle. Herein, a clock duty cycle is always shorter than the playback duty cycle. The master device may broadcast the playback sync timestamp of the played content by using the playback delay time correction amount condition. In operation 550, the slave device may additionally adjust a local clock correction amount within the clock duty cycle by using the local clock drift lists and the playback time lists of all of the slave devices connected to the network.

In operation 560, the slave device corrects a timer and the playback sync timestamp with the playback delay time correction amount determined in operation 550 and synchronizes the playback of the content.

In operation 570, the slave device transmits a playback delay time calculated in the period of the playback duty cycle to the master device. It is desirable that the playback delay time corrected with the playback delay time correction amount is included in the strobe signal based on the playback duty cycle and transmitted to the master device.

In operation 580, the slave device may determine whether to transmit the playback delay time according to whether the playback delay time satisfies a predetermined threshold value. When the playback delay time calculated in operation 570 is larger than threshold value, operation 520 or operation 530 may be performed, and when the playback delay time calculated in operation 570 is not larger than threshold value, the method may be terminated.

In the meantime, when the plurality of slave devices connected to the network transmit a user feedback signal to the master device, the slave devices transmit the user feedback signal in the same playback duty cycle section, so that the plurality of devices may effectively process the user real-time signal without a delay.

Figure 6:
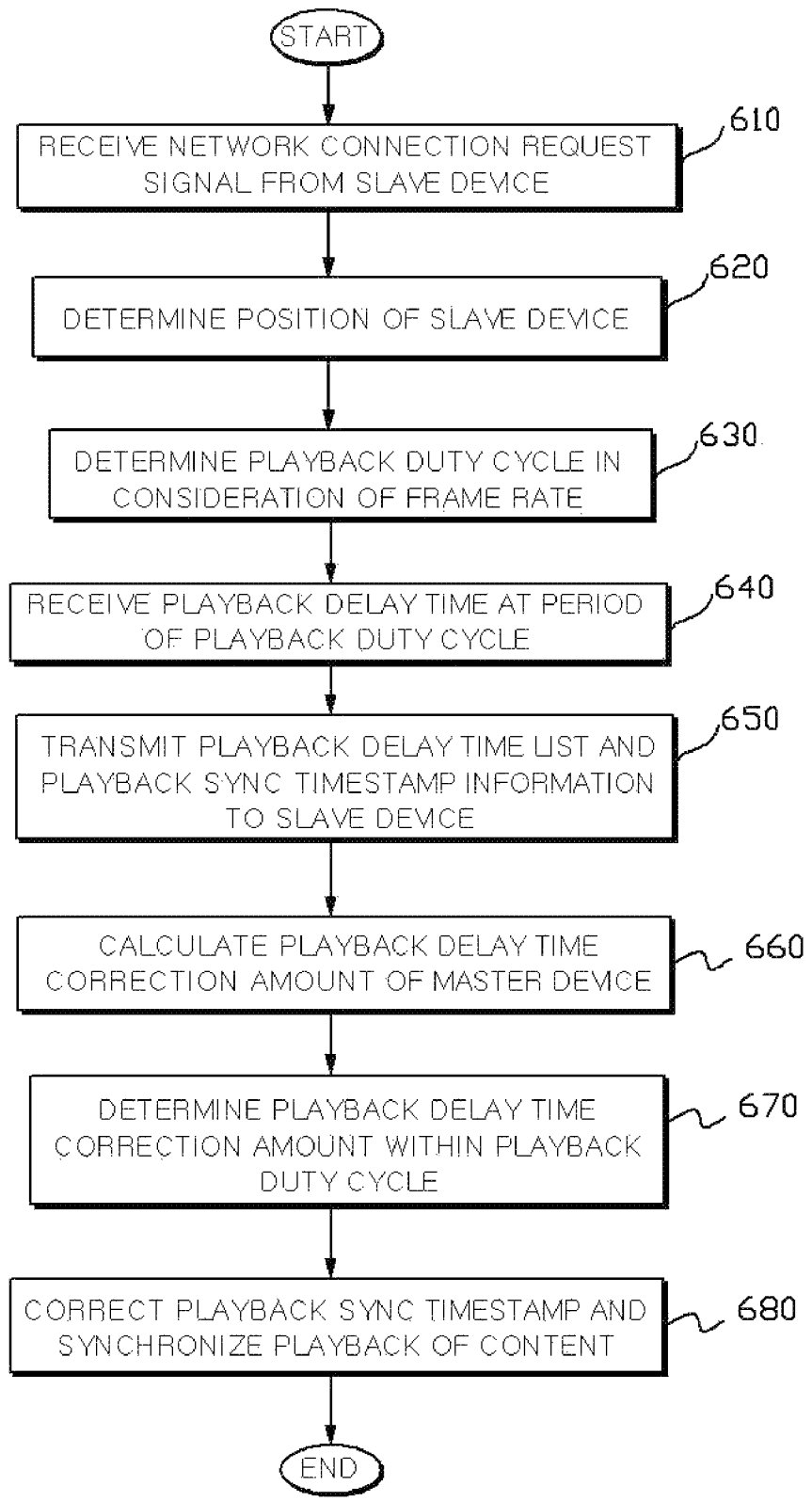
FIG. 6 is a flowchart illustrating a method of synchronizing, by a master device, playback of a digital content between the connected devices according to the exemplary embodiment of the present invention.

FIG. 6 is a flowchart illustrating a method of synchronizing, by the master device, playback of a digital content between the connected devices according to the exemplary embodiment of the present invention.

Referring to FIG. 6, the method of synchronizing, by the connected device, playback of a digital content according to the present exemplary embodiment includes operations time-serially processed in the master device illustrated in FIG. 4. Accordingly, even if omitted below, the contents described above with respect to the master device illustrated in FIG. 4 is also applied to the method of synchronizing, by the master device, playback of a digital content between the connected devices according to the present exemplary embodiment.

In operation 610, the master device receives a network connection request signal from the slave device.

In operation 620, the master device determines a position of the slave device. The position information of the slave device may also be determined by each slave device and be determined by the master device. The position information of the slave device may be calibrated based on position information received from a camera mounted to the master device and the slave device.

In operation 630, the master device determines a playback duty cycle in consideration of a frame rate of a played content. It is desirable that the playback duty cycle is determined in consideration of channel information in addition to the frame rate of the digital content.

In operation 640, the master device receives a playback delay time calculated in the period of the playback duty cycle from the slave device.

In operation 650, the master device transmits a playback delay time list, delta playback delay time list information, or playback sync timestamp information collected during the playback duty cycle to the slave device. The playback delay time list or the delta playback delay time list information may include a local clock drift list or a delta local clock drift list.

The playback sync timestamp may be determined based on a time difference between the playback delay times included in the playback delay time list or within the playback duty cycle, that is, the delta playback delay time list.

As another exemplary embodiment, the playback sync timestamp may determine a timestamp at which a standard deviation between the playback delay times included in the playback delay time list is calculated smallest as a playback sync timestamp.

In operation 660, the master device calculates a playback delay time correction amount for correcting the playback sync timestamp of the master device.

In operation 670, the master device may adjust a master clock correction amount (local-clock correction amount) within a clock duty cycle or determine a playback delay time correction amount within the playback duty cycle. Herein, the clock duty cycle is always shorter than the playback duty cycle. The master device may broadcast the playback sync timestamp of the playback content by using the playback delay time correction amount condition.

In operation 680, the master device corrects a timer with the playback delay time correction amount determined in operation 670 and corrects the playback sync timestamp and synchronizes the playback of the content.

The term " . . . unit" used in the present exemplary embodiment refers to software or a hardware component, such as a Field Programmable Gate Array (FPGA) or an Application Specific Integrated Circuit (ASIC), and the " . . . unit" serves a specific role. However, the " . . . unit" is not limited to software or hardware. The " . . . unit" may also be configured to be included in an addressable storage medium and may be configured to reproduce one or more processors. Accordingly, as an example, the " . . . unit" includes components, such as software components, object-oriented software components, class components, and task components, and processes, functions, attributes, procedures, subroutines, segments of a program code, drivers, firmware, micro-codes, circuits, data, database, data structures, tables, arrays, and variables. The components and the function provided in the " . . . unit" may be combined into a smaller number of components and " . . . unit" or further separated into additional components and " . . . units". In addition, components and the " . . . unit" may also be implemented to play one or more CPUS within a device or a security multimedia card.

All of the foregoing functions may be performed by a processor, such as a microprocessor, a controller, a microcontroller, and an ASIC, according to software or a program code coded so as to perform the function. A design, development, and implementation of the code may be obvious to those skilled in the art based on the description of the present invention.

Although the present invention has been described with reference to the exemplary embodiment of the present invention, it is understood that those skilled in the art may variously modify, change, and carry out the present invention without departing from the spirit and the scope of the present invention. Accordingly, the present invention is not limited to the foregoing exemplary embodiment and may include all of the exemplary embodiments within the scope of the accompanying claims.

The invention claimed is:

1. A method of synchronizing playback of a digital content between connected devices, the method comprising:
receiving a playback delay time list or a playback sync timestamp from a master device during a playback duty cycle;
calculating a playback delay time correction amount by referring to the playback delay time list in order to synchronize playback between a plurality of connected devices including the master device;

correcting a playback sync timestamp used in the playback synchronization according to the playback delay time correction amount; and playing a digital content according to the corrected playback sync timestamp.

2. The method of claim 1, further comprising:

transmitting, by the connected device, a playback delay time corrected during the playback duty cycle to the master device.

3. The method of claim 1, further comprising:

transmitting a user feedback signal input during the playback duty cycle to the master device.

4. The method of claim 1, wherein the playback duty cycle is determined based on a frame rate of the digital content.

5. The method of claim 1, wherein a time difference between the playback delay times included in the playback delay time list is within a range of the playback duty cycle.

6. The method of claim 1, wherein in the calculating of the playback delay time correction amount, the playback delay time correction amount is determined by calculating the difference based on a playback delay time of a connected device which minimizes a difference between the playback delay time lists of the plurality of connected devices including the master device.

7. A method of synchronizing playback of a digital content between connected devices, the method comprising:

receiving a playback delay time from a plurality of connected devices during a playback duty cycle;

generating a playback delay time list by using the playback delay time received from each of the plurality of connected devices and a playback delay time of a master device, and calculating a playback sync timestamp by using the playback delay time list; and transmitting the generated playback delay time list or a playback sync timestamp used in playback synchronization to the connected devices.

8. The method of claim 7, wherein the playback sync timestamp for the playback synchronization is determined based on the playback delay time list or a time difference between the playback delay times included in the playback delay time list.

9. The method of claim 7, wherein the playback duty cycle is determined based on a frame rate or channel information of the digital content.

10. The method of claim 7, wherein the playback delay time correction amount is determined by calculating a difference based on a playback delay time of a connected device which minimizes the difference between the playback delay time lists of the plurality of connected devices including the master device receiving the playback delay time.

11. A method of synchronizing playback of a digital content between connected devices, the method comprising:

receiving, by a master device, a playback delay time from a plurality of connected devices during a playback duty cycle;

generating a playback delay time list by using the playback delay time received from each of the plurality of connected devices and a playback delay time of a master device, and calculating a playback sync timestamp by using the playback delay time list;

transmitting the generated playback delay time list or a playback sync timestamp used in playback synchronization to the connected devices;

receiving, by the plurality of connected devices, the playback delay time list or the playback sync timestamp used for the playback synchronization from the master device during the playback duty cycle;

calculating a playback delay time correction amount by referring to the playback delay time list in order for the plurality of connected devices including the master device to synchronize playback;

correcting, by the master device and the plurality of connected devices, the playback sync timestamp used for the playback synchronization according to the playback delay time correction amount; and playing a digital content according to the corrected playback sync timestamp.

12. A connected device for synchronizing playback of a digital content, the connected device comprising:

a reception unit configured to receive a playback delay time list or a playback sync timestamp from a master device during a playback duty cycle;

a playback delay time correction amount calculation unit configured to calculate a playback delay time correction amount by referring to the playback delay time list in order to synchronize playback between a plurality of connected devices including the master device;

a playback sync timestamp correction unit configured to correct a playback sync timestamp used for the playback synchronization according to the playback delay time correction amount; and a playback unit configured to play a digital content according to the corrected playback sync timestamp.

13. A master device for synchronizing playback of a digital content between connected devices, the maser device comprising:

a reception unit configured to receive a playback delay time from a plurality of connected devices during a playback duty cycle;

a playback delay time list generation unit configured to generate a playback delay time list by using a playback delay time received from each of the plurality of connected devices, and a playback delay time of the master device; and a transmission unit configured to transmit the generated playback delay time list or a playback sync timestamp used in playback synchronization to the connected devices.

14. A system for synchronizing playback of a digital content between connected devices, the system comprising:

one or more connected devices including:

a reception unit configured to receive a playback delay time list or a playback sync timestamp from a master device during a playback duty cycle;

a playback delay time correction amount calculation unit configured to calculate a playback delay time correction amount by referring to the playback delay time list in order to synchronize playback between a plurality of connected devices including the master device;

a playback sync timestamp correction unit configured to correct a playback sync timestamp used for the playback synchronization according to the playback delay time correction amount; and one or more connected devices including a playback unit which plays a digital contents according to the corrected playback sync timestamp; and a master device including:

a reception unit configured to receive a playback delay time from a plurality of connected devices during a playback duty cycle;

a playback delay time list generation unit configured to generate a playback delay time list by using a playback delay time received from each of the plurality of connected devices, and a playback delay time of the master device; and a transmission unit configured to transmit the generated playback delay time list or a playback sync timestamp used in playback synchronization to the connected devices.

15. A computer-readable recording medium in which a program for executing the method of claim 1 in a computer is recorded.

* * * * *